US007720312B2

(12) United States Patent
Maier et al.

(10) Patent No.: US 7,720,312 B2
(45) Date of Patent: May 18, 2010

(54) IMAGE PROCESSOR

(75) Inventors: Michael Maier, Schwenningen (DE); Bernhard Broghammer, Tennenbronn (DE); Günther Huber, Bad-Dürrheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 941 days.

(21) Appl. No.: 11/061,115

(22) Filed: Feb. 17, 2005

(65) Prior Publication Data
US 2005/0213853 A1 Sep. 29, 2005

(30) Foreign Application Priority Data
Feb. 18, 2004 (EP) ................... 04003662

(51) Int. Cl.
*G06K 9/54* (2006.01)
(52) U.S. Cl. .................. 382/302; 345/629; 710/244
(58) Field of Classification Search ............... 382/302; 345/629, 418, 630; 710/244
See application file for complete search history.

(56) References Cited

U.S. PATENT DOCUMENTS

| 5,638,499 | A  | * | 6/1997  | O'Connor et al. ........... 345/630 |
| 5,864,342 | A  | * | 1/1999  | Kajiya et al. ................. 345/418 |
| 6,189,064 | B1 | * | 2/2001  | MacInnis et al. ............ 710/244 |
| 6,377,269 | B1 | * | 4/2002  | Kay et al. .................... 345/589 |
| 6,466,210 | B1 | * | 10/2002 | Carlsen et al. ............... 345/629 |
| 6,661,427 | B1 | * | 12/2003 | MacInnis et al. ............. 345/660 |
| 6,771,263 | B1 | * | 8/2004  | Behrens et al. .............. 345/424 |
| 2002/0093516 | A1 | * | 7/2002 | Brunner et al. .............. 345/629 |
| 2003/0189571 | A1 |   | 10/2003 | MacInnis et al.          |

FOREIGN PATENT DOCUMENTS

WO          WO 94/06111        3/1994

* cited by examiner

Primary Examiner—Daniel G Mariam
Assistant Examiner—Aklilu K Woldemariam

(57) ABSTRACT

An image processor includes a memory that stores image layers, α-layers associated with the image layers, and pointers linking image areas of the image layers with the α-layer. A method for blending multiple image layers includes obtaining a transparency value for an image area by reading a pointer associated with the image area and blending the image layers using the obtained transparency value.

26 Claims, 11 Drawing Sheets

LUT

IMAGE PROCESSOR

PRIORITY CLAIM

This application claims the benefit of EPO 04003662.6, filed Feb. 18, 2004. The disclosure of the above application is incorporated herein by reference.

BACKGROUND OF THE INVENTION

1. Technical Field

The invention is directed to image processors, particularly an image processor capable of generating a blended image from a number of image layers using alpha-blending.

2. Related Art

Information devices may employ graphical schemes. An information and system may displays maps overlaid with route information and image elements. Some systems may employ graphics display controllers that are used to control image layers that may be addressed by a computer. The image layers may be blended into an output image. The layer concept may independently control different image elements that make up a complex image.

Chroma-keying is an image blending technique. In this technique, a specific color of an image may be replaced by another (background) image. α-blending is another image blending technique. In this technique, image elements may be transparently overlaid on a background image. A color value of a blended image may then be calculated from respective color values of the image layers.

In some α-blending systems, a large amount of data needs to be generated. The data is processed to update the α-layer each time the transparency of an element changes. Some information systems lack the computing power needed to continuously update the α-layer.

Therefore, a need exists for an improved system that creates an efficient dynamic transparency effect.

SUMMARY

A processor generates a blended image from a number of image layers. An α-layer that indicates a transparency value of selected image areas is assigned to the image layers. A memory connected to the processor stores a transparency table that includes transparency values. The α-layer includes a variable that contains the memory location (address) of the transparency value.

An auxiliary processor may be connected to the processor. The α-layer data may indicate a transparency value of the image areas processed by the processor. The auxiliary processor may be connected to memory that stores a transparency table having a number of transparency values. A second memory may be connected to the auxiliary processor for storing a pointer-layer. The pointer may be associated with an image area. The auxiliary processor may include a device that generates an α-layer, having a transparency value for the image areas to be processed.

A method for generating a blended image combines a number of image layers using an α-layer. The method may provide an α-layer assigned to one image layer, which indicates the transparency of the image areas. A transparency value for an image area may be found by reading a memory location associated with the image area. By referring to a transparency table, the method blends the image layers using transparency values.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 is a block diagram of a transparency look-up table having a plurality of address groups accessed through a predetermined offset to an initial address.

DETAILED DESCRIPTION OF THE PREFERRED EMBODIMENTS

Figure 1:
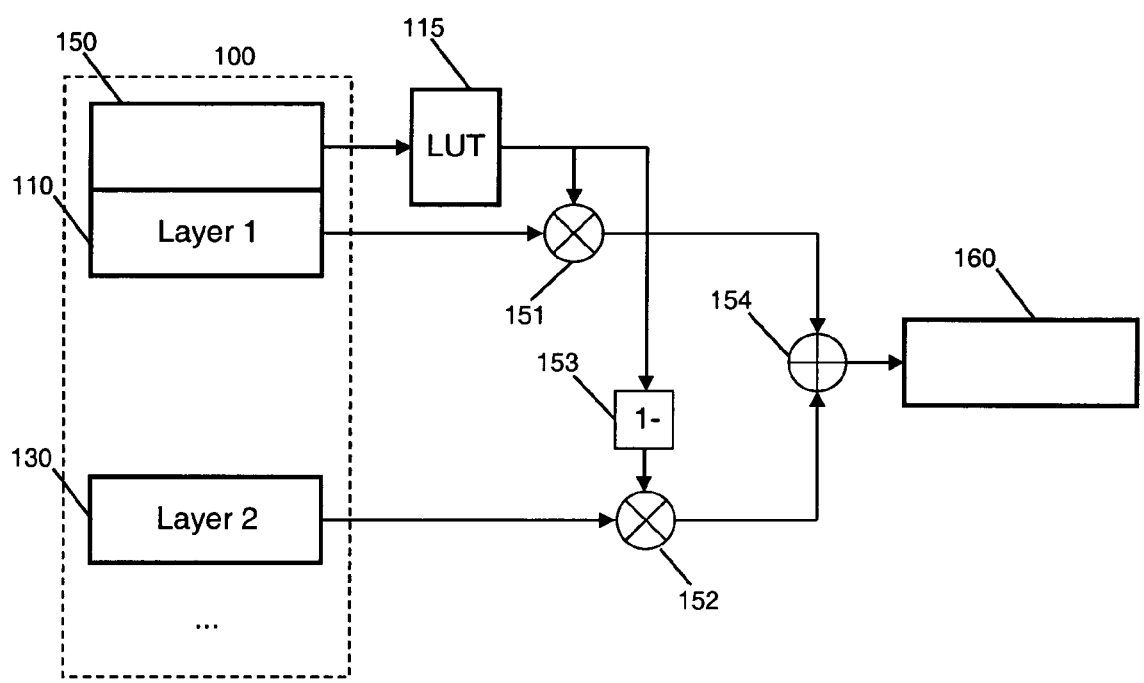
FIG. 1 is a block diagram of an image processor.

FIG. 1 is an image processor coupled to a memory 100. The memory 100 may be connected to the image processor or integrated within the image processor. As shown, the memory 100 is a volatile memory (e.g. RAM), but may also be a non-volatile memory such as a hard-disk drive, a flash memory, or re-writable media such as CD-RW or DVD-RW. In FIG. 1, a plurality of image layers, such as layer 110 and layer 130 are stored in the memory 100 to be combined in a blended image 160. At least one of the image layers, such as the image layer 110, is associated with an α-layer 150. The α-layer may not store transparency values (α-values). The memory 100 may retain variables that contain the memory locations to a transparency look-up table 115. By providing these variables or pointers to a transparency table, the α-values of an associated image region or pixel may be changed without changing the value of the memory location. The pointers may minimize the memory requirements and dynamic effects of low-speed processors.

Different image areas of image layer 110 are associated with different pointers of the α-layer 150 in FIG. 1. As shown, look-up table 115 is stored in a memory 100. The transparency values are stored at predetermined locations (e.g. addresses) in the memory 100. Each pointer may contain an address that allows each image area of the image layer 110 to be assigned a transparency value from the look-up table 115.

Figure 2:
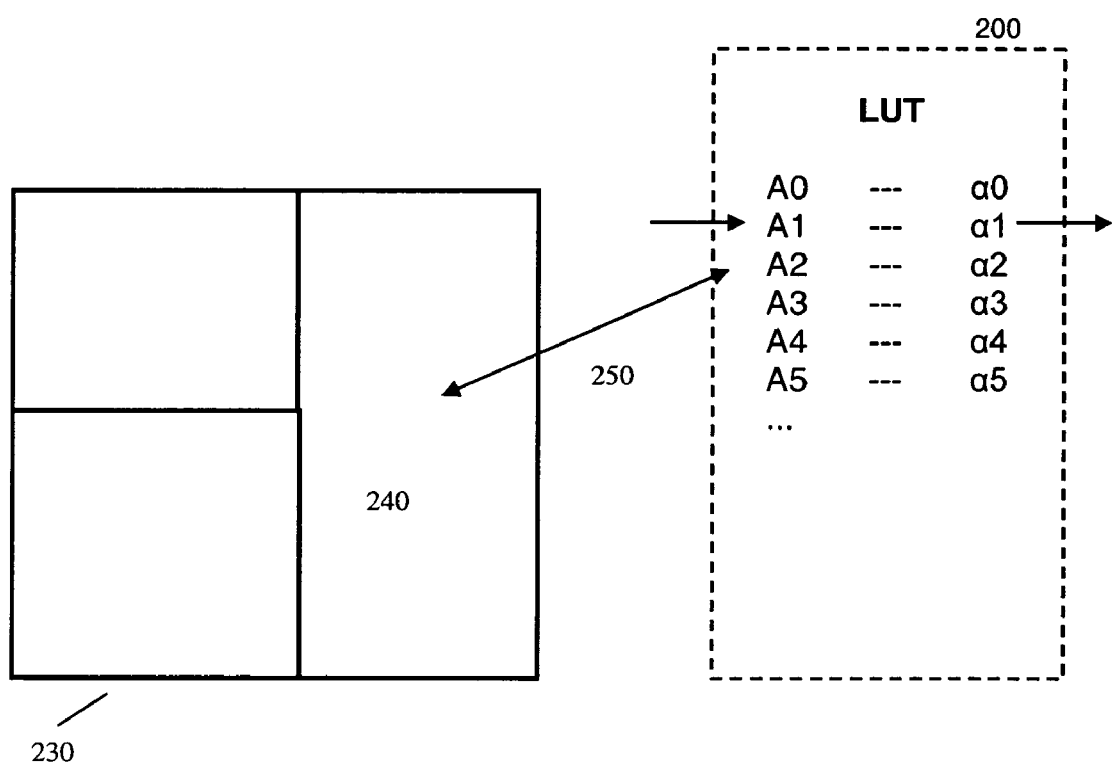
FIG. 2 is a block diagram of transparency look-up table and a diagram of an image area associated with the look-up table.

FIG. 2 shows the relationship between the image area 230 and the α-values stored in the look-up table 200. Individual regions of the image area 240 may be assigned particular α-values α0, α1, ..., α5, ... αn at corresponding addresses A0, A1, ..., A5, ... An of a memory 210. Individual image regions 240 may be altered without affecting the entire image area 230, by changing α-values without altering the entire α-layer table. By referring to a specific address, a corresponding transparency value can be obtained. In FIG. 2, transparency value α1 is obtained by referencing to a memory address A1. α-values of an image area may be changed by altering the pointer 250 rather than altering the α-values themselves. The application may be used with graphics, where the transparency of an image element is dynamically changed. In some applications, changing a pointer requires less computing power and generates less data than changing the transparency value itself.

In FIG. 1, a memory 100 connected to the image processor or integrated in the image processor stores a first image layer 110 and a second image layer 130. At least one of the image layers, such as the image layer 110, is associated with an α-layer 115. The α-layer may not store transparency values (α-values) but may retain pointers to a transparency look-up table 115. The memory 100 may store the image data as red-green-blue (RGB) data. In such a case, a color value of a blended image 160 is calculated from respective color values of the image layers 110 and 130 in accordance with the following formula:

$$R1/2 = \alpha \times R1 + (1-\alpha) \times R2$$

In above equation, R1/2 represents the red color value of a pixel of the blended image 160, R1 the red color value of a corresponding pixel of image layer 110, and R2 the red color value of a corresponding pixel of image layer 130. α is a transparency value ($0 \leq \alpha \leq 1$) from the look-up table 115 referred from the pointer associated with that pixel. This calculation is correspondingly performed for each color value R, G, B for each pixel of blended image 160. Arithmetic elements 151, 152, 153 and 154 symbolize the multiplication, subtraction, and addition controllers, respectively, performed by the image processor to evaluate the above specified formula. The multiplication, subtraction, and addition controllers may be implemented with digital image or signal processing software libraries associated with processors and image processors. The above calculation used in the α-blending technique is described for images stored in accordance with the RGB color coding standard. However, an equivalent equation can by obtained for any other color coding system, such as YUV, CMYK, CMK, HLT, Pantone, and other color coding systems.

Figure 3:
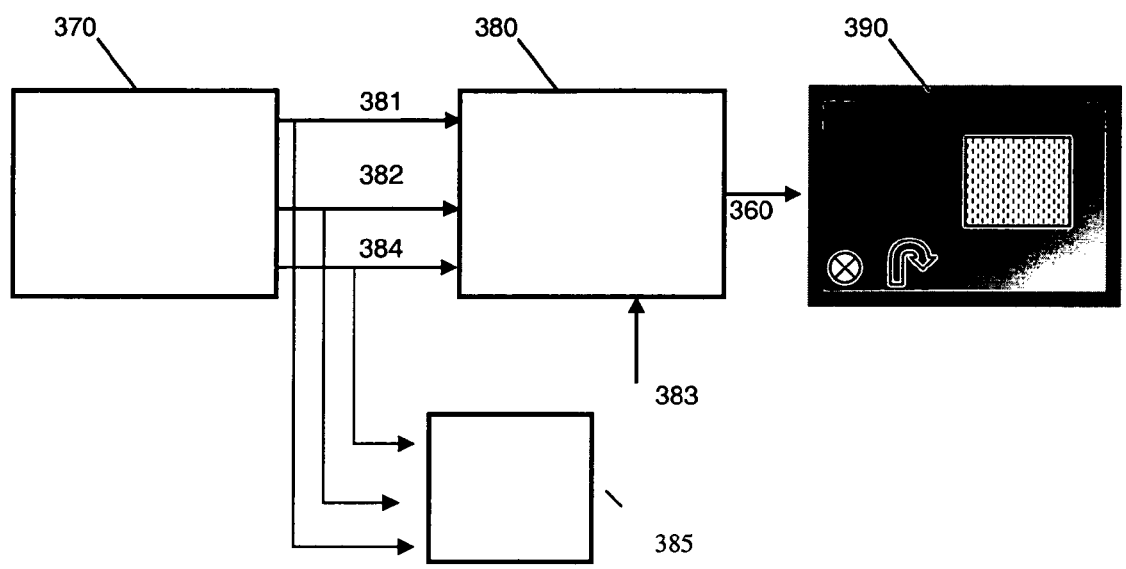
FIG. 3 is a block diagram of a vehicle information and entertainment system having an image processor.

A vehicle information and entertainment system as shown in FIG. 3 utilizes the image processor of FIG. 1. A processor 370 may control the image processor 380 to display a blended image 360 on the display 390. Image processor 380 receives image data 381 from processor 370 and generates images and image elements on multiple image layers. Image data 381 may, in addition to pixel data, include graphic commands, such as line draw commands. Also, data of at least one α-layer may be provided to the image processor. This data represents pointers to addresses of the memory storing the transparency look-up table. This data may assign image areas of one of the image layers with transparency values from the look-up table. In addition, the transparency values of the look-up table 384 are transferred to the image processor 380 by a processor 370. An additional input unit may be provided at the image processor 380 to supply one of the image layers with auxiliary video data 383. Such input unit may be stored on external memory modules 350, semiconductor memory units like flash memory, hard-disk drives, or optical media like CD and DVD discs.

Figure 4:
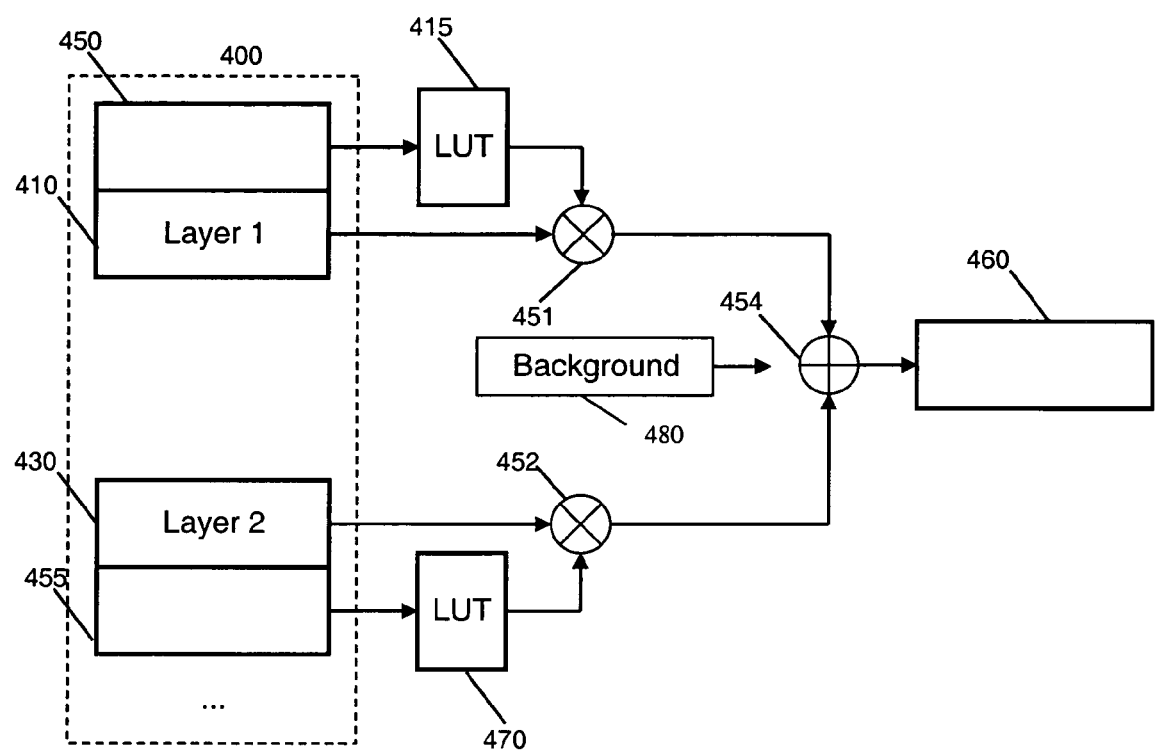
FIG. 4 is a block diagram of an image processor having an individual α-layer.

In FIG. 4, the α-layer 450 is calculated and provided to the image processor when the composition of the blended image changes. This occurs when image elements are created, moved or changed in shape. If only the transparency of an image element is changed, only a corresponding value in the transparency look-up table needs to be calculated by processor 400 and provided to the image processor. Thus, a dynamic change in the transparency of an image element may require little computation and may keep the amount of transferred data low. Even processors with low computation power, such as embedded processor systems, may efficiently perform dynamic transparency effects such as smooth fading of image elements.

Image data 381, α-layer data 382, and transparency values 384 for look-up table 415 can be transferred from processor 370 to image processor 380 by an internal device bus. However, it is also possible to have the processor 370 write such data directly to an external memory 385 connected with the image processor, which performs the image blending based on the data stored in that external memory 385.

Figure 5:
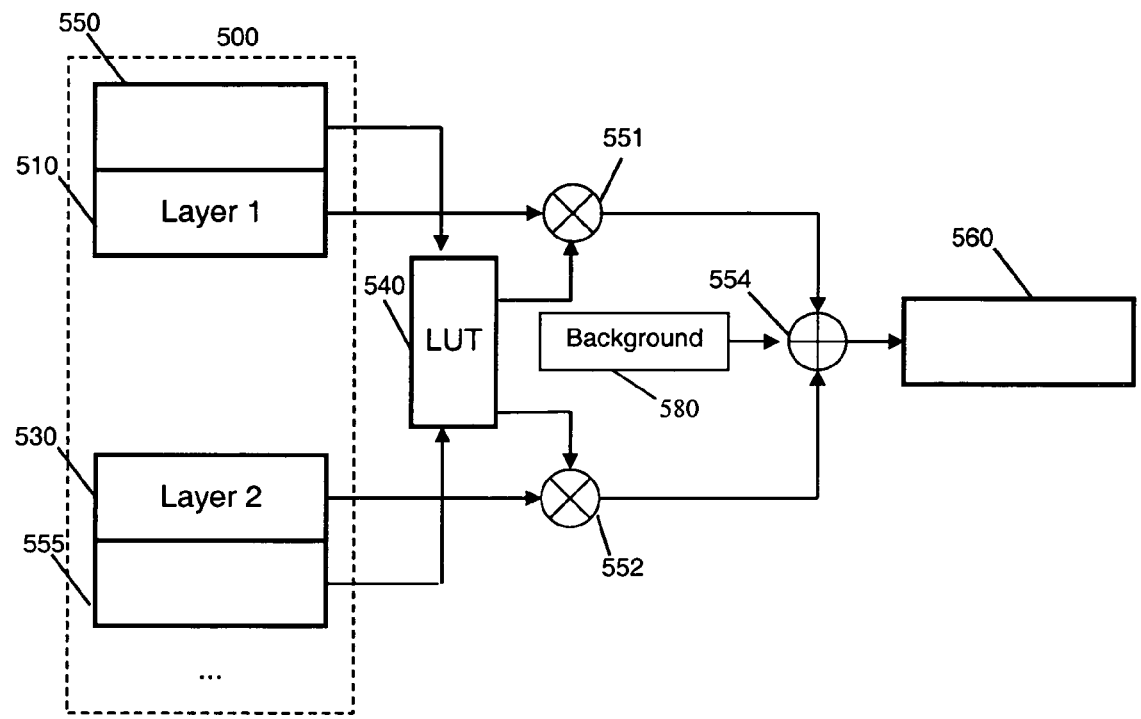
FIG. 5 is a block diagram of an image processor having individual α-layers assigned to a number of the image layers.

The image processors of FIGS. 4 and 5 are not limited to assigning an α-layer to only a single image layer. A plurality of the image layers can be each associated with an individual α-layer 450 and 455 (550 and 555), which allows image elements on a plurality of image layers to be rendered transparent or semi-transparent against an underlying background image.

In the schematic system configuration of FIG. 4, at least two image layers 410 and 430 are provided with individual α-layers 450 and 455. Each α-layer stores pointers associated with image areas of the respective image layer. Each individual α-layer 450 and 455 refers to a corresponding individual look-up table 415 and 470 storing transparency values.

The calculation of the blended image 460 has to be adapted accordingly. The calculation includes multiplying pixel color values of each of the plural image layers with corresponding transparency values (α-values); optionally determining a contribution of a background image layer; and adding the multiplied pixel values and an optional background image contribution 480.

In FIG. 4, alpha layers and the separate transparency look-up tables to which the pointers refer can be separately determined. It is possible to independently change the transparency of image elements on different image layers by changing the transparency values in the respective look-up tables.

The pointers that are linked to many individual α-layers may refer to a single transparency look-up table, as shown in FIG. 5. A single look-up table 540 stores the α-values which are referred to by a plurality of α-layers 550 and 555.

In order to obtain a transparency value for an image area of a specific image layer 510, a pointer associated with that image area is selected from the corresponding α-layer 550. This pointer refers to an entry in look-up table 540, such that the image area of layer 510 is assigned with a transparency value. Image areas of image layer 530 are assigned a transparency value from look-up table 540 by employing pointers stored in α-layer 550. The image processor of FIG. 5 may lower the memory requirements for a look-up table, even though a plurality of the image layers may be provided with α-layers. In addition, structures for handling access to the look-up table can be implemented more efficiently, since only a single look-up table needs to be addressed.

Figure 9:
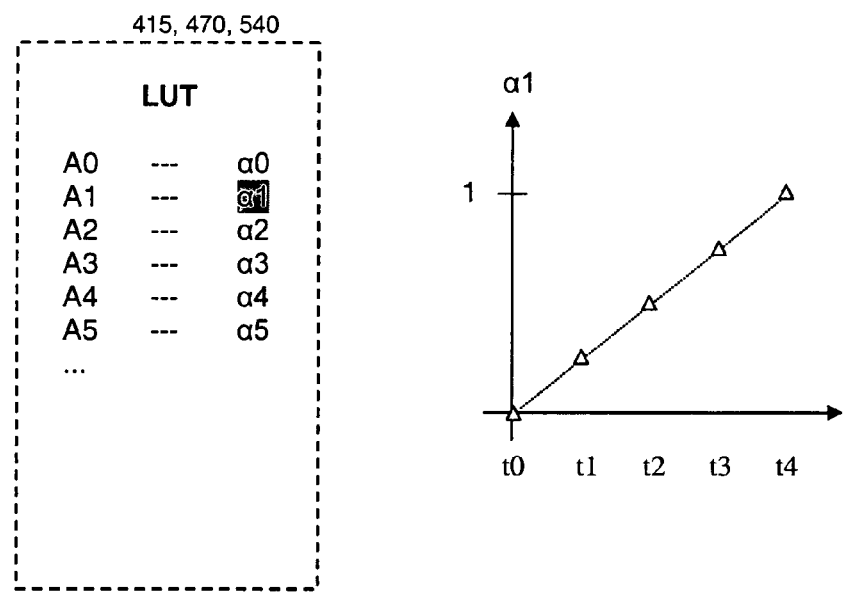
FIG. 9 illustrates a fade-in effect executed by an image processor.
Figure 9:
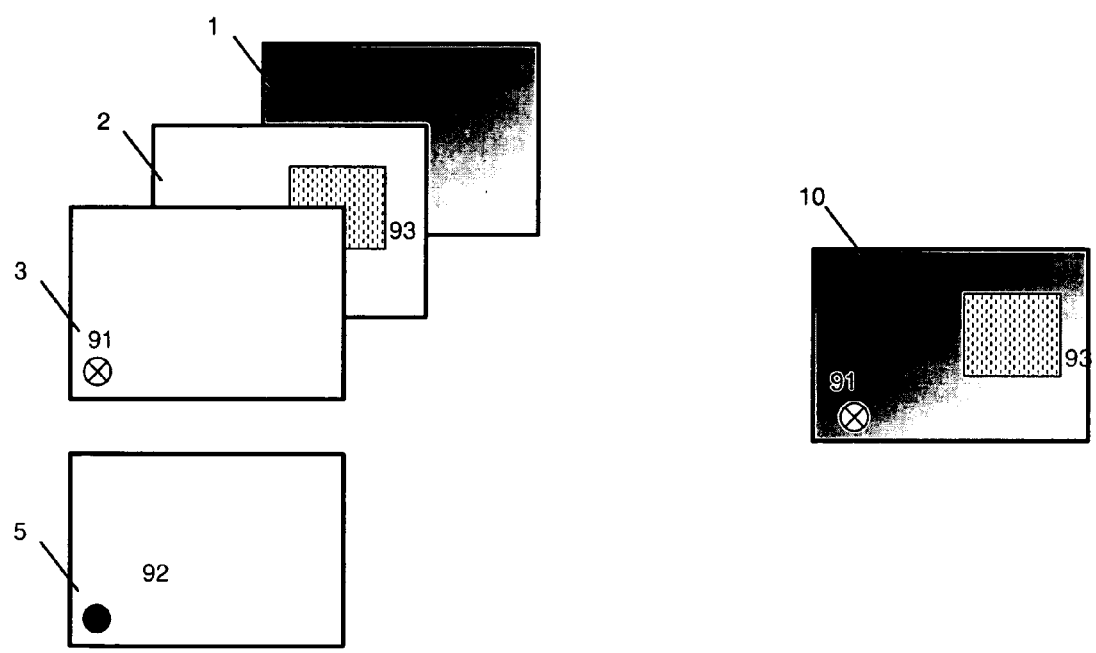

A fade-in effect can be efficiently used in a vehicle information and entertainment system equipped with an image processor. A look-up table for transparency values such as look-up table 415, 470 or 540 is stored on a memory. The look-up table stores different transparency values at different addresses of the memory. In FIG. 9, the transparency of an image element specified by the transparency value $\alpha 1$ is changed from full transparency to full opacity. An object slowly becomes visible against a background, through several changes in transparency.

An image element, for instance, a button of a graphical user interface 91 is faded-in as soon as a specific control option associated with that button becomes available. This image element is stored as image element 92 on image layer 3, in this example. A corresponding $\alpha$-layer, such as $\alpha$-layer 550 or 555 includes at least one pointer, associated with the image element 91 (e.g., the button) and assigns the transparency value $\alpha 1$ being stored at address A1 in the respective look-up table 415, 470 or 540 to this image element.

The fade-in effect is controlled by a processor which repeatedly provides a new transparency value $\alpha 1$ to be stored at address A1 of the look-up table. At a time t0 the transparency value $\alpha 1$ is 0, and may indicate full transparency in this example. This means that at this time, image element 91 is invisible. After a predetermined time interval, the transparency value is increased at a time point t1, such that the image element 91 becomes now slightly visible. By further increasing the transparency value $\alpha 1$ in regular time intervals, the visibility of the button increases, until at a time t4, full opacity is reached, and the image element 91 is visible against the background image as a solid button.

Other time behavior of the transparency value $\alpha 1$ of an image element can be implemented to perform different fade-in effects. The transparency value may be increased in smaller intervals to achieve a smoother fade-in effect or in larger intervals to implement a more step-like fade-in effect. Analogously, a fade-out can also be realized. Other effects, such as replacing an image element with another image element, can be easily devised.

Figure 10:
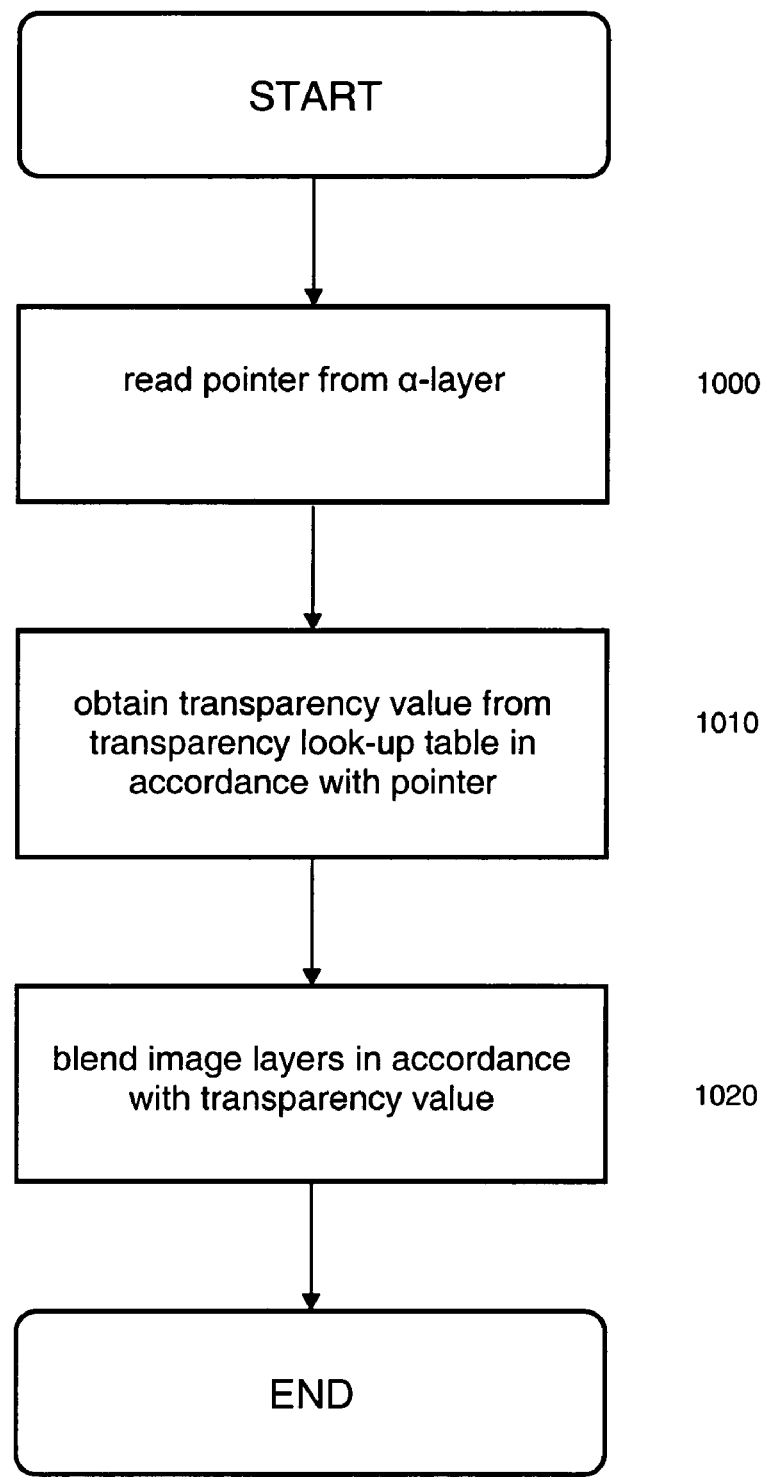
FIG. 10 is a flow-chart for blending image layers.

FIG. 10 shows a method for blending images by the image processors of the application. At 1000, a pointer is read from an $\alpha$-layer which is associated with one of the image layers to be blended. Next, a transparency value is obtained 1010 from a transparency look-up table in accordance with the pointer read in 1000. Thus, an image layer to be blended is assigned with transparency values. Finally, the image layers are blended in accordance with the transparency value 1020.

Figure 6:
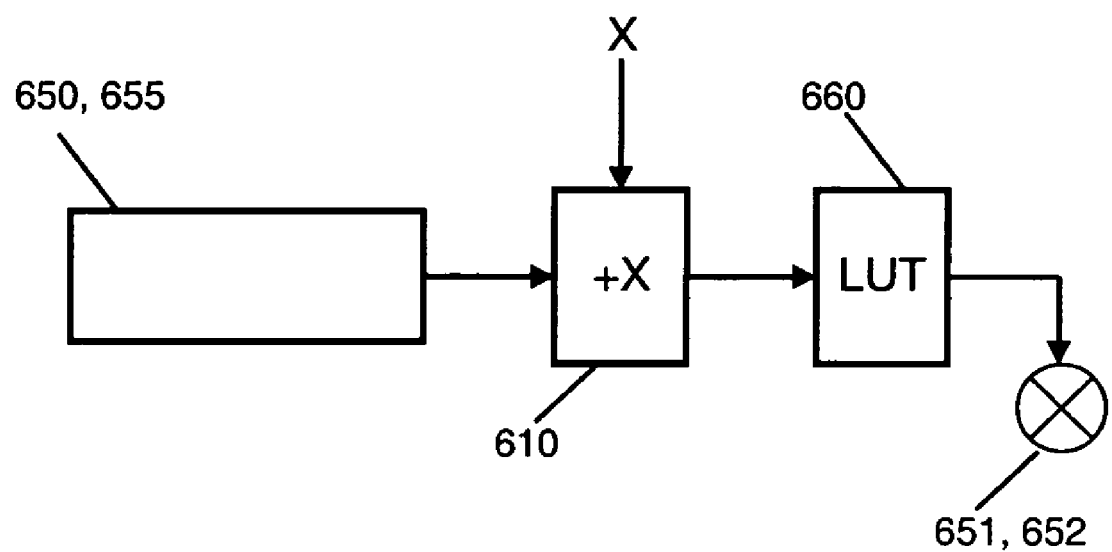
FIG. 6 is a block diagram of an image processor adding an offset to a pointer that references a transparency look-up table.

The efficiency of the process may be increased by providing an additional adder which adds an offset value to the pointers, as illustrated in FIG. 6 and FIG. 7. FIG. 6 depicts a partial configuration of the above described image processors including $\alpha$-layer 650 or 655 (see FIG. 6) and an adder 610 for adding an offset value X to the pointer obtained from the $\alpha$-layer. A transparency value may be selected from the look-up table 660 according to the pointer to which the off-set X has been added. This transparency value, may be assigned to the image area to which the pointer corresponds, and the calculation of the blended image color values may be executed by a multiplier 651 and 652.

FIG. 7 shows a configuration of a look-up table 700 storing transparency values. These transparency values may be designated by a pointer to which an off-set value X has been added. This look-up table 700 may be organized in several groups of $\alpha$-values, stored at address intervals so that respective groups of $\alpha$-values may be referred to by adding predetermined off-set values to a base address A0. Specifically, a first group of transparency values $\alpha 0$, $\alpha 1$, ... $\alpha n$ may be stored at addresses A0, A1, ... An. These transparency values are obtained when the offset X has a value of 0. A next set of transparency values $\alpha 0'$, $\alpha 1'$, ... may be stored at addresses A0+x1, A1+x1, etc. These transparency values may be obtained by using x1 as offset X. Another group of transparency values $\alpha 0''$, $\alpha 1''$, ... may be stored at addresses A0+x2, A1+x2, ..., where x2 is set as offset X, to refer to the transparency values $\alpha 0''$, $\alpha 1''$, ..., etc.

In FIG. 7, transparency values of a plurality of image elements may be changed at the same time by changing the offset value added to the pointers of the $\alpha$-layer. For each offset value, the pointers may refer to another group of transparency values, such that it is not necessary to calculate transparency values when performing a transparency change effect. The transparency values of the plurality of groups may be calculated, so that only the offset value has to be specified to refer to different groups of transparency values during the execution of a transparency change effect. The processing load of a processor can then be further lowered during the execution of the transparency change effects. Specifically, the processor only needs to specify the offset value and provide the offset value to the image processor.

Figure 11:
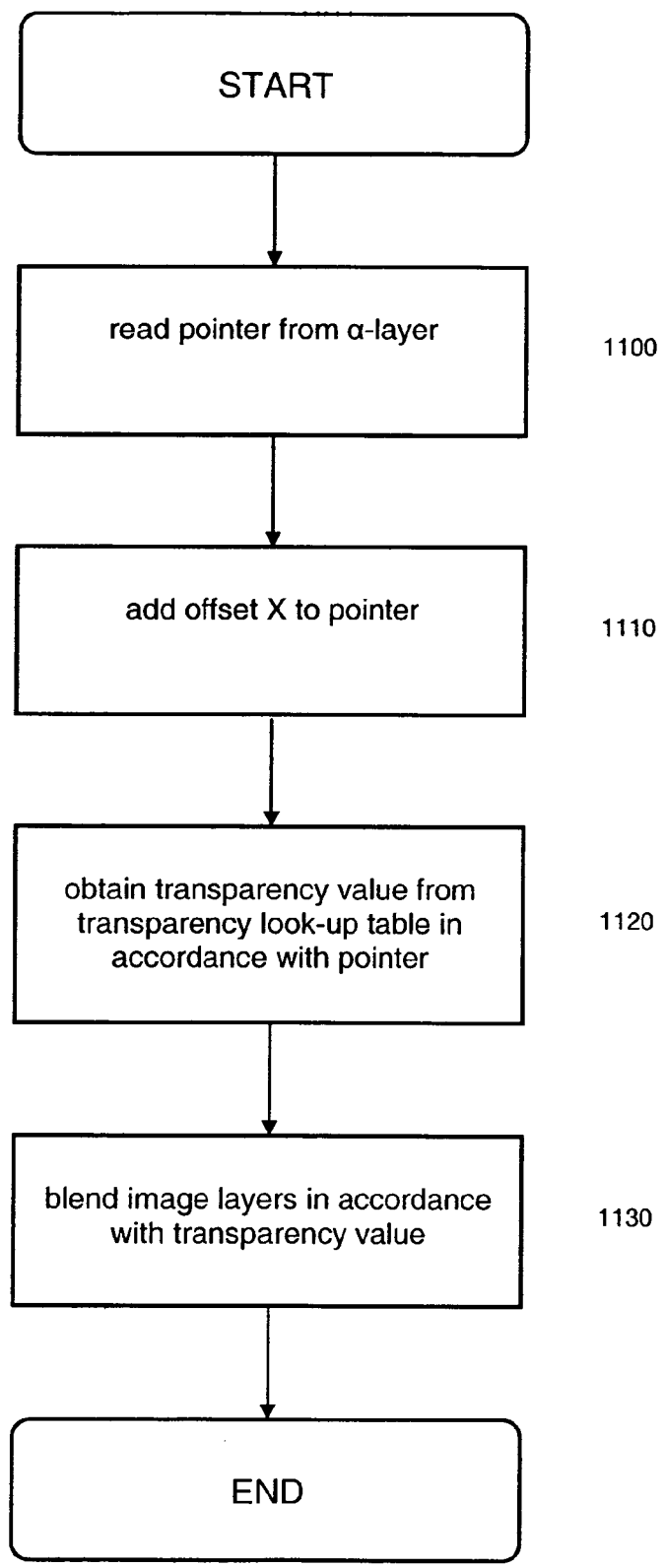
FIG. 11 is a flow-chart for obtaining a blended image using an off-set to the pointer values.

An image processor that may add an offset to a pointer is shown in FIG. 11. After a pointer has been read from an $\alpha$-layer in 1100, an offset X is added to the pointer 1110. Next, a transparency value is obtained 1120 from a transparency look-up table according to the pointer to which the offset X has been added in 1110. Finally, the image layers are blended in accordance with the transparency value obtained from the look-up table 1130.

In a vehicle information and entertainment system a processor 370 may control the image processor 380. The system may display a blended image on a display screen 390 that may include a 7-inch LCD display having 480×240 pixels. Other screen sizes and resolutions may also be used. Accordingly, the image layers of the image processor 380 are configured to predetermined size such as 480×240 pixels. Each $\alpha$-layer assigned to one of the image layers stores a pointer for each pixel of the corresponding image layer, making it is possible to assign transparency values with pixel-based accuracy.

The transparency look-up table used in this example holds sixteen transparency values. Each pixel can be assigned one of sixteen different transparency values. Each transparency value is stored in a data length of 4-bits. Through this organization, transparency may be specified with a graduation of sixteen different transparency values between full transparency and full opacity. A transparency look-up table holding sixteen transparency values each having a length of 4-bit may only require eight bytes of memory (64 bits), rendering the storage requirements for the look-up table very low. The processor 370 and the image processor 380 are configured such that the processor 370 may directly write transparency values into a memory storing the transparency look-up table.

Figure 8:
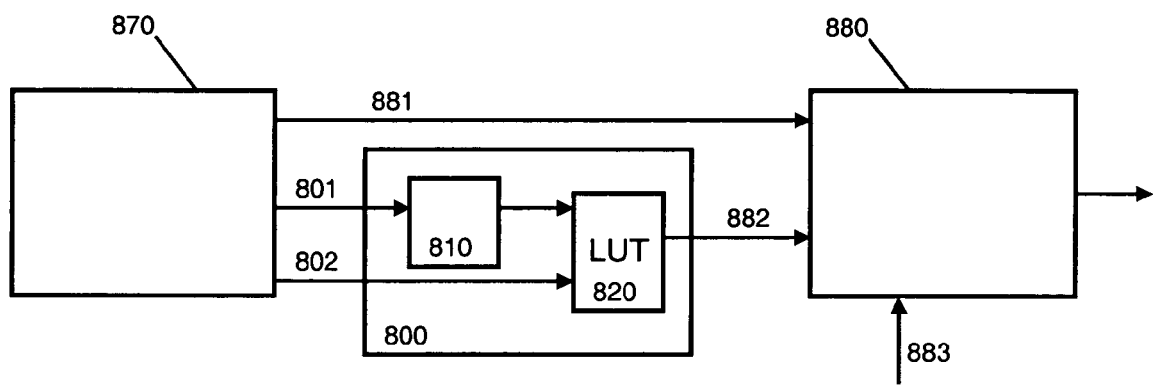
FIG. 8 is a block diagram of a vehicle information and entertainment system having a processor, an image processor, and an auxiliary processor.

In FIG. 8, a system includes an auxiliary processor 800 that is capable of generating an $\alpha$-layer that includes transparency values to be transferred to an image processor 880. The auxiliary processor 800 may include a first memory for storing a transparency table including a plurality of transparency values at particular memory addresses. It may also include a second memory for storing a pointer-layer including a pointer associated with an image area of the image layer to be processed, the pointer referring to an address of the first memory. The auxiliary processor may also include a generating unit for generating an $\alpha$-layer that includes a transparency value for each image area of the image layer to be processed by assigning a transparency value to each image area associated with the pointer.

From a processor 870, the auxiliary processor 800 receives an $\alpha$-layer, including pointers 810 and a look-up table 820 storing transparency values. Processor 870 supplies image data 881 to an image processor 880. Image processor 880 further employs an α-layer including transparency values in order to generate a blended image. However, processor 870 provides a pointer-layer of α-layer data 801 specifying an α-layer through pointers 810 linked to a look-up table 820, and transparency table data 802 to be stored as a look-up table 820.

Data 801 and 802 are provided to auxiliary processor 800 to be stored as α-layer 810 (including pointers as a pointer-layer) and look-up table 820 data. From this data, auxiliary processor 800 generates an α-layer that includes a transparency value for each image area of one of the plurality of image layers for the image processor 880. Auxiliary processor 800 may obtain a pointer associated with a specific image area from the stored α-layer, refer to a transparency look-up table 820, which may store transparency values at predetermined memory addresses, and assign a transparency value to the specific image area associated with the pointer. The auxiliary processor 800 thus converts α-layer data 810 (representing pointers to a look-up table 820), and transparency table data 802 (representing transparency values of a look-up table 820) into a conventional α-layer 882 comprising a transparency value for each image area.

The auxiliary processor 800 decreases the processing load. By having the processor 870 supply α-layer data representing pointers to a look-up table and transparency values to the image processor 800, the system reduces the processing load. When the transparency of an image element is changed, only a corresponding value of the look-up table 820 needs to be updated. Thus, even embedded processors of low computing power may be capable of performing transparency change effects. Also, a standard graphics processor capable of performing image blending in accordance with a conventional α-layer (e.g., an α-layer including transparency values) can be utilized.

In addition, the processor 870 may also add an offset value to the pointers provided to the auxiliary processor 800 depicted in FIG. 8. As depicted in FIG. 6, an offset value X may be added to a pointer of the α-layer 810 before referring to the transparency look-up table 820. Furthermore, the transparency table 820 can be configured to hold sixteen transparency values, each having a length of 4 bits. The transparency table requires low memory, while providing a sufficient number of different transparency values and a satisfactory graduation of {fraction (1/16)}-step increments.

The auxiliary processor may be programmed to store a pointer for each pixel of a corresponding image layer in the image processor 880. α-blending may then be carried out with a pixel-based accuracy. The auxiliary processor may also be adapted so that individual α-layers (containing transparency values) are assigned to a plurality of image layers of image processor 880. Then, the auxiliary processor 800 receives data of a plurality of α-layers, including pointers to a transparency look-up table and data of one or more transparency look-up tables to which the pointers refer. From this data, the individual α-layers (containing transparency values) to be supplied to the image processor 880 are generated. The assignment between transparency tables and α-layers can be implemented as in FIGS. 4 and 5.

The application also provides a computer program product, comprising one or more computer readable media having computer-executable instructions for blending a plurality of image layers using at least one α-layer to generate a blended image according to the system described above. The method to blend multiple images may be encoded in a computer readable medium such as a memory, programmed within a device such as one or more integrated circuits, or processed by a controller or a computer. If the methods are performed by software, the software may reside in a memory resident to or interfaced to the image processor or any other type of non-volatile or volatile memory interfaced or resident to the image processor. The memory may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An image processor system comprising:
   a processor that generates a blended image from a plurality of image layers in accordance with at least one α-layer independent from image color, the α-layer assigned to one of the plurality of image layers that indicates a transparency of image areas of the assigned image layer;
   a transparency table including a plurality of transparency values;
   a memory coupled with the processor for storing the transparency table;
   a pointer associated with an image area of the assigned image layer that refers to an address of the memory to assign a transparency value to the image area, where the α-layer assigned to one of the plurality of image layers retains the pointer for referencing the transparency table stored in the memory; and
   an adder that adds an offset valve to the pointer, where the transparency values in the transparency table are organized in groups that are stored, at address intervals, where a change to the offset value changes the group of transparency values that are referred to by the pointer, further where each of the offset values added to the pointer references a different one of the groups of transparency values, where a transparency change effect is performed by specifying a different offset value.

2. The image processor system of claim 1, where an individual α-layer is assigned to each of a plurality of the image layers, each of the individual α-layers including a pointer associated with an image area of the assigned image layer.

3. The image processor system of claim 2, comprising a plurality of transparency tables, where each of the individual α-layers refers to a corresponding transparency table.

4. The image processor system of claim 2, where all of the individual α-layers refer to a single transparency table.

5. The image processor system of claim 1, further comprising a multiplier that calculates a blended image color value based on the transparency value with which the pointer corresponds.

6. The image processor system of claim 1, further comprising an input unit that receives α-layer data including the pointer and transparency table data comprising transparency values.

7. The image processor system of claim 6, further comprising an offset input that receives the offset value.

8. The image processor system of claim 7, where the transparency table holds 16 transparency values, each transparency value having a length of 4 bits.

9. The image processor system of claim 8, where the image area corresponds to a pixel of the assigned image layer.

10. The image processor system of claim 9, where the image layer has a size of 480*240 pixels.

11. The image processor system of claim 10, where the α-layer stores a pointer for each pixel of the assigned image layer.

12. A method to blend a plurality of image layers using at least one α-layer to generate a blended image comprising:
assigning the α-layer to one of the plurality of image layers that indicates a transparency of image areas of the assigned image layer independent from image color;
obtaining a transparency value for an image area of the assigned image layer by reading a pointer associated with the image area from the α-layer
referring to an address of a memory associated with the pointer, where the memory stores a transparency table including a plurality of transparency values;
organizing the transparency table into groups that are stored at address intervals, where the groups are referenced by the pointer depending on an offset value;
adding the offset value to the pointer to reference a particular group of transparency values;
changing the offset value added to the pointer to reference a different group of transparency values; and
blending the plurality of image layers using the obtained transparency value.

13. The method of claim 12, further comprising performing a fade-in/fade-out effect for an image object of the assigned image layer, by changing at least one transparency value in the transparency table that indicates the transparency of an image area corresponding to the image object.

14. The method claim 13, where an individual α-layer is assigned to each of a plurality of the image layers, each of the individual α-layers including a pointer associated with an image area of the assigned image layer.

15. The method of claim 14, comprising a plurality of transparency tables, where each of the individual α-layers refers to a corresponding transparency table.

16. The method of claim 14, where all of the individual α-layers refer to a single transparency table.

17. The method of claim 16, further comprising receiving α-layer data including the pointer and transparency table data comprising the transparency values.

18. The method of claim 17, further comprising adding an offset value to the pointer.

19. The method of claim 18, further comprising receiving the offset value.

20. The method of claim 19, where the transparency table holds 16 transparency values, each transparency value having a length of 4 bits.

21. The method of claim 20, where the image area corresponds to a pixel of the assigned image layer.

22. The method of claim 21, where the image layer has a size of 480*240 pixels.

23. The method of claim 22, where the α-layer stores a pointer for each pixel of the assigned image layer.

24. The method of claim 12, where the blending further comprises blending a background contribution with the plurality of image layers.

25. An image processor system comprising:
means for generating with an image processor a blended image from a plurality of image layers in accordance with at least one α-layer independent from image color, the α-layer assigned to one of the plurality of image layers that indicates a transparency of image areas of the assigned image layer;
means for storing in a memory coupled to the image processor a transparency table including a plurality of transparency values, where the α-layer includes means for associating the α-layer with an image area of the assigned image layer;
means for assigning the α-layer to one of the plurality of image layers that indicates a transparency of image areas of the assigned image layer in the memory,
means for organizing the transparency values in the transparency table in groups that are stored at address intervals in the memory, where the groups are referenced by the pointer depending on an offset value;
means for adding the offset value to the pointer to reference a particular group of transparency values;
means for changing the offset value added to the pointer to reference a different group of transparency values such that for each offset value another of the groups of transparency values is referred to by the pointer with the offset value;
means for changing each of the at least one α-layer with a pointer that is associated with the transparency table when the plurality of transparency values in the transparency table changes; and
means for associating the α-layer with an image area of the assigned image layer referring to an address of the memory to assign a transparency value to the image area of the memory.

26. In a computer readable storage medium having stored therein data representing instructions executable by a programmed processor for blending a plurality of image layers using at least one α-layer, the storage medium comprising instructions for:
providing an α-layer assigned to one of the plurality of image layers for indicating a transparency of image areas of the assigned image layer independent from image color;
obtaining transparency values for an image area of the assigned image layer by reading a pointer associated with the image area from the α-layer;

referring to an address of a memory associated with the pointer, where the memory stores a transparency table including a plurality of transparency values;

organizing the transparency values in the transparency table in groups that are stored at address intervals, where the groups are referenced by the pointer depending on an offset value;

changing the group of transparency values that are referred to by the pointer when the offset value changes such that for each offset value another of the groups of transparency values is referred to by the pointer;

changing each of the at least one $\alpha$-layer with a pointer that is associated with the transparency table when the plurality of transparency values in the transparency table changes; and blending the plurality of image layers using the obtained transparency value.

* * * * *

UNITED STATES PATENT AND TRADEMARK OFFICE
CERTIFICATE OF CORRECTION

| | | |
|---|---|---|
| PATENT NO. | : 7,720,312 B2 | Page 1 of 1 |
| APPLICATION NO. | : 11/061115 | |
| DATED | : May 18, 2010 | |
| INVENTOR(S) | : Maier et al. | |

It is certified that error appears in the above-identified patent and that said Letters Patent is hereby corrected as shown below:

At column 1, line 17, change "information and system may displays" to --information and entertainment system may display--
At column 2, line 53, insert --150-- after "α-layer"
At column 3, line 3, change "regions of the image area 240" to --regions 240 of the image area 230--
At column 3, line 5, delete reference numeral "210" after "a memory"
At column 3, line 8, insert --200-- after "α-layer table"
At column 3, line 22, change reference numeral "115" to --150-- after "α-layer," and insert --150-- after "The α-layer"
At column 3, line 59, insert --380-- after "image processor"
At column 3, line 62 and line 83, insert --384-- after "transparency values"
At column 3, line 63, delete "384" after "look-up table"
At column 4, line 1, change reference numeral "350" to --385--
At column 4, line 22, insert --380-- after "image processor"
At column 4, line 60, change reference numeral "550" to --555--
At column 6, line 31, insert --360-- after "blended image"
At column 6, line 40, line 41, line 44 and line 46, insert --384-- after "transparency values"
At column 6, line 61, insert --800-- after "auxiliary processor"
At column 7, line 47 and line 50, insert --800-- after "auxiliary processor"
In Claim 1, column 8, line 63, "valve" should be changed to --value--

Signed and Sealed this
Twenty-eighth Day of June, 2011

David J. Kappos
*Director of the United States Patent and Trademark Office*